US011619307B2

(12) United States Patent
Obertanner et al.

(10) Patent No.: US 11,619,307 B2
(45) Date of Patent: Apr. 4, 2023

(54) MECHANICAL FACE SEAL ASSEMBLY, IN PARTICULAR FOR HOT MEDIA, AND PUMP ASSEMBLY (71) Applicant: EagleBurgmann Germany GmbH & Co. KG, Wolfratshausen (DE)

(72) Inventors: Kilian Obertanner, Pullach (DE); Johannes Bauer, Wackersberg (DE); Josef Gerg, Egling (DE); Stefan Ledig, Pöcking (DE); Joseph Kiermeir, Tutzing (DE); Christoph Rapp, Sauerlach (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 68 days.

(21) Appl. No.: 17/604,081

(22) PCT Filed: Feb. 25, 2020

(86) PCT No.: PCT/EP2020/054864
§ 371 (c)(1),
(2) Date: Oct. 15, 2021

(87) PCT Pub. No.: WO2020/221489
PCT Pub. Date: Nov. 5, 2020

(65) Prior Publication Data
US 2022/0221060 A1      Jul. 14, 2022

(30) Foreign Application Priority Data

Apr. 30, 2019   (DE) .................... 10 2019 206 205.9

(51) Int. Cl.
*F16J 15/34*      (2006.01)
*F04D 1/00*       (2006.01)
*F04D 29/12*      (2006.01)

(52) U.S. Cl.
CPC ............ *F16J 15/3404* (2013.01); *F04D 1/00* (2013.01); *F04D 29/126* (2013.01)

(58) Field of Classification Search
CPC .... F16J 15/3404; F16J 15/342; F16J 15/3464; F16J 15/348; F16J 15/3492; F04D 1/00; F04D 29/126
See application file for complete search history.

(56) References Cited

U.S. PATENT DOCUMENTS 4,721,311 A  *  1/1988  Kakabaker ............. F16J 15/162
                                                              277/408
4,979,875 A     12/1990  Muller et al.
(Continued)

FOREIGN PATENT DOCUMENTS

DE        29800616 U1     3/1998
DE        19983245 T1     6/2001
(Continued)

OTHER PUBLICATIONS

Japanese Office Action dated Dec. 14, 2022, issued during the prosecution of Japanese Patent Application No. JP 2021-563634.
(Continued)

*Primary Examiner* — Gilbert Y Lee
(74) *Attorney, Agent, or Firm* — Locke Lord LLP; Scott D. Wofsy (57) ABSTRACT The invention relates to a mechanical seal arrangement for sealing on a rotating component (21), comprising a slide ring seal (2) having a rotating slide ring (3) and a stationary slide ring (4), which define a sealing gap (5) between the sliding surfaces (3*a*, 4*a*) thereof, a recirculation conveyor (7) arranged adjacent to the rotating slide ring (3) wherein the recirculation conveyor (7) comprises a recirculation line (19) in which a cooling device (20) for cooling the recirculated fluid is arranged, a recirculation rotor (8) and a hollow cylindrical housing (9), wherein the recirculation line (19)
(Continued)

leads to a cavity (6) in the region of the sealing gap (5) of the sliding ring seal (2), wherein the hollow cylindrical housing (9) comprises an inner shell surface (11) and an outer shell surface (12) and wherein a conveyor channel (10) is provided on the outer shell surface (12), which conveyor channel (10) is formed along the outer shell surface (12) from a start portion (13) to an end portion (14) wherein the start portion (13) of the conveyor channel (10) is separated from the end portion (14) by a separating web (15), wherein a plurality of feed openings (16) are provided in the hollow cylindrical housing (9), which open from the inner shell surface (11) into the conveyor channel (10), and wherein a single outlet opening (17) is provided at the end portion (14). (FIG. 1)

12 Claims, 6 Drawing Sheets

(56) References Cited

U.S. PATENT DOCUMENTS

| | | | | |
|---|---|---|---|---|
| 5,076,589 | A * | 12/1991 | Marsi | F16J 15/3404 277/927 |
| 5,540,449 | A | 7/1996 | Algers et al. | |
| 6,079,942 | A | 6/2000 | Weir et al. | |
| 6,371,488 | B1 * | 4/2002 | Szymborski | F04D 29/126 277/358 |
| 9,695,941 | B2 * | 7/2017 | Fichtner | F16J 15/3404 |
| 2005/0082765 | A1 * | 4/2005 | Khonsari | F16J 15/3404 277/359 |
| 2020/0309146 | A1 * | 10/2020 | Yoshikawa | F04D 29/586 |

FOREIGN PATENT DOCUMENTS

| | | |
|---|---|---|
| DE | 102011118294 B3 | 4/2013 |
| DE | 102011122543 A1 | 6/2013 |
| DE | 102014203336 A1 | 9/2015 |
| DE | 102017211719 A1 | 1/2019 |
| EP | 1967774 A1 | 9/2008 |
| JP | H02-500458 A | 2/1990 |
| JP | 2014139463 A | 7/2014 |
| JP | 2017506318 A | 3/2017 |

OTHER PUBLICATIONS

International Search Report issued in PCT/EP2020/054864, dated Jun. 17, 2020.

* cited by examiner

MECHANICAL FACE SEAL ASSEMBLY, IN PARTICULAR FOR HOT MEDIA, AND PUMP ASSEMBLY

CROSS-REFERENCE TO RELATED APPLICATIONS

This application is a U.S. National Phase Application filed under 35 U.S.C. § 371, based on International Patent Application No. PCT/EP2020/054864, filed Feb. 25, 2020, which claims priority to German Patent Application No. 10 2019 206 205.9, filed on Apr. 30, 2019, the entire contents of which is incorporated herein by reference.

The invention relates to a mechanical seal arrangement, especially for use with hot media, and a pump arrangement having such mechanical seal arrangement.

Mechanical seal arrangements are known from the prior art in various configurations. When operated, heat may arise in the region of the slide rings of the mechanical seal, which, in extreme cases, may cause damage or short service life of the slide rings. To reduce the temperature at the slide rings, a cooled sealing medium is used, which is fed to the slide rings and especially into the sealing gap. This allows reduction of temperature at the slide rings. However, the disadvantage herein resides in that considerable constructive work incorporating an additional barrier fluid system is required. The problem of heat generation is further increased, for example, when the mechanical seal arrangement is used with hot media, such as in power plant applications.

Therefore, the object of the present invention is to provide a mechanical seal arrangement, especially for sealing hot media, which can avoid temperature-mediated damage of the mechanical seal by incorporating simple and easy design and low-cost manufacturability. Furthermore, it is the object of the present invention to provide a pump arrangement which is especially suitable for conveying hot media and which enables the pump of the pump arrangement to be sealed using a mechanical seal arrangement according to the invention.

This object will be solved by a mechanical seal arrangement having the features of claim 1 or a pump arrangement having the features of claim 11. The respective subordinate claims show preferred further embodiments of the invention.

The mechanical seal arrangement according to the invention having the features of claim 1 has the advantage that significantly improved cooling of the mechanical seal will be allowed. Furthermore, the design and manufacture of the mechanical seal arrangement can significantly be simplified, as no separate sealing circuit is required. In particular, an additional circulating pump in the sealing circuit including an additional cooling medium may be omitted, which, in addition to saving the circulating pump, also allows reduction of energy required during operation of the mechanical seal arrangement. According to the invention, this will be achieved by the mechanical seal arrangement comprising a mechanical seal including a rotating slide ring and a stationary slide ring, which define a sealing gap between their sliding surfaces.

Furthermore, a recirculation conveyor is provided, which is arranged adjacent to the rotating slide ring. The recirculation conveyor conveys fluid into a recirculation line, in which a cooling device is arranged for cooling the circulated fluid. The recirculation line leads from the recirculation conveyor to a cavity arranged at the sealing gap of the mechanical seal. This allows cool medium to be fed to the slide rings. The recirculation conveyor comprises a rotating recirculation rotor and a hollow cylindrical housing. The recirculation rotor is connected to a rotating component, for example a shaft or a sleeve mounted on the shaft. The housing of the recirculation conveyor includes an inner and an outer shell surface, wherein a conveyor channel is provided on the outer shell surface. The conveyor channel is comprised of a start portion and an end portion and is formed in the circumferential direction along the outer shell surface. The start portion and the end portion are separated from each other by a separating web. As a result, the conveyor channel is not circumferentially closed, but the start region and the end region do not communicate with each other in a circumferential direction as the separating web provides separation. Furthermore, a plurality of feed openings are provided which open from the inner shell surface of the housing into the conveyor channel. Furthermore, a single outlet opening is provided at the end portion of the conveyor channel.

Thus, the fluid is conveyed by the recirculation conveyor from the inner surface of the housing through the feed openings into the conveyor channel and from the conveyor channel via the outlet opening into the recirculation line towards the cooling device. After the fluid has been cooled in the cooling device, the cooled fluid is led to the cavity at the sealing gap of the slide ring seal for appropriately cooling the slide rings located adjacent thereto. This reduces wear of the slide rings and significantly extends the service life of the slide rings and the entire mechanical seal, which means that replacement intervals can be increased. The mechanical seal arrangement according to the invention is particularly suitable for the sealing of hot media, for example in power plant applications or industrial applications using hot media.

Preferably, the outlet opening on the housing of the recirculation conveyor is directed in the axial direction of the mechanical seal arrangement. This results in a particularly simple and easy structure of the mechanical seal arrangement, which can be designed to be small, especially in a radial direction. This allows simple and easy mounting of the mechanical seal arrangement in a housing of a pump, for example of a power station or the like.

According to another preferred embodiment of the present invention, a width of the conveyor channel in the housing of the recirculation conveyor increases starting from the start portion to the end portion. Particularly preferably, the width of the conveyor channel increases continuously. Alternatively, the width of the conveyor channel increases in steps from the start portion to the end portion, preferably in steps of equal size. Since a plurality of feed openings are provided in the housing along the circumference, a pressure level of the fluid in the region of the conveyor channel remains largely constant during operation, since the pressure actually increases as a result of the widening of the conveyor channel, but this pressure level is reduced again as a result of continuous feeding at a plurality of positions via the feeding devices.

To achieve best conveying performance, the plurality of feed openings into the conveyor channel are inclined at an acute angle a in a radial direction of the mechanical seal arrangement.

Particularly preferably, the recirculation rotor of the recirculation conveyor comprises a plurality of blades. Preferably, the blades are arcuate hollow cylinder sections, allowing particularly easy and inexpensive manufacture thereof. Further preferably, the blades are arranged partly radially inside the feed openings in the housing of the recirculation conveyor.

To avoid eventual vibrations occurring during operation, a number of the blades of the circulation rotor is not a multiple of the number of feed openings. That is, the number of blades and the number of feed openings are not the same, or not twice as large, or not three times as large, and so on. For example, five feed openings are provided and nine blades. Thus, vibrations during operation will significantly be reduced, so that service life of the mechanical seal can further be increased. To achieve best conveying performance of the recirculation conveyor, preferably all center points of the feed openings in the housing are arranged in a first plane, which is perpendicular to the center axis of the mechanical seal.

Further preferably, the conveyor channel in the housing of the recirculation conveyor is formed such that the conveyor channel is comprised of a first wall which is located in a second plane perpendicular to the center axis X-X of the mechanical seal.

Preferably, the start of the outlet opening is located in a third plane which is perpendicular to the axial direction. In this case, a first distance between the second and third planes is at least twice as large as a second distance between the second and first planes. This causes a distance to be greater between the first plane where the feed openings are located and the plane where the outlet opening starts. As a result, the conveying performance of the recirculation conveyor can be further improved.

Furthermore, the present invention relates to a pump arrangement comprising a pump having a pump rotor and a mechanical seal arrangement according to the invention.

The pump arrangement is preferably designed such that the mechanical seal arrangement is arranged radially within a housing part of the pump. This causes the structure to short in length, especially in the axial direction, since the mechanical seal arrangement can be positioned especially directly adjacent to the pump rotor of the pump. Since the recirculation conveyor is arranged directly on the mechanical seal and having particularly flat design, especially in the radial direction of the mechanical seal, existing pumps may also be upgraded easily using the mechanical seal arrangement according to the invention, as simple and easily incorporation into a housing of pumps that are already installed therein is allowed.

The pump arrangement is preferably designed for pumping hot media, for example hot feed water of power plant applications or the like.

In the following, a preferred embodiment of the invention is described in detail while reference will be made to the accompanying drawing, wherein.

Making reference to FIGS. 1 to 6, a pump arrangement 30 having a mechanical seal arrangement 1 according to a first preferred embodiment of the invention will be set forth hereinafter.

Figure 1:
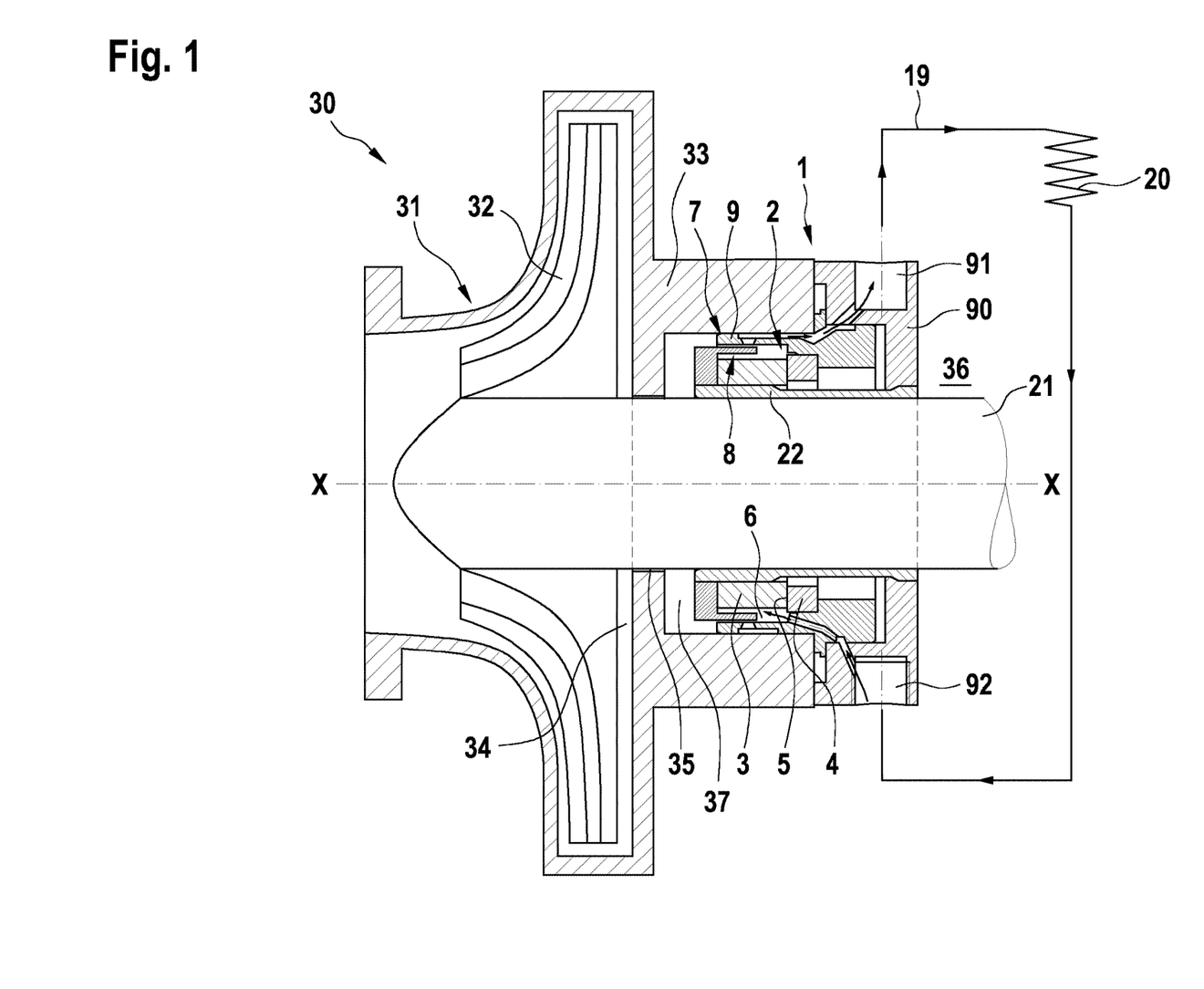
FIG. 1 is a schematic view of a pump arrangement with a mechanical seal arrangement according to a first preferred embodiment of the invention.

As shown in FIG. 1, the pump arrangement 30 includes a pump 31 and a mechanical seal arrangement 1 that seals a fluid chamber 34 of the pump 31 from an atmosphere 36 on a drive shaft 21.

The pump 31 comprises a pump rotor 32, which is arranged in a pump housing 33. The fluid chamber 34 is connected to a receiving chamber 37 where the mechanical seal arrangement 1 is arranged, via a gap 35 between the drive shaft 21 and the pump housing 33.

Figure 2:
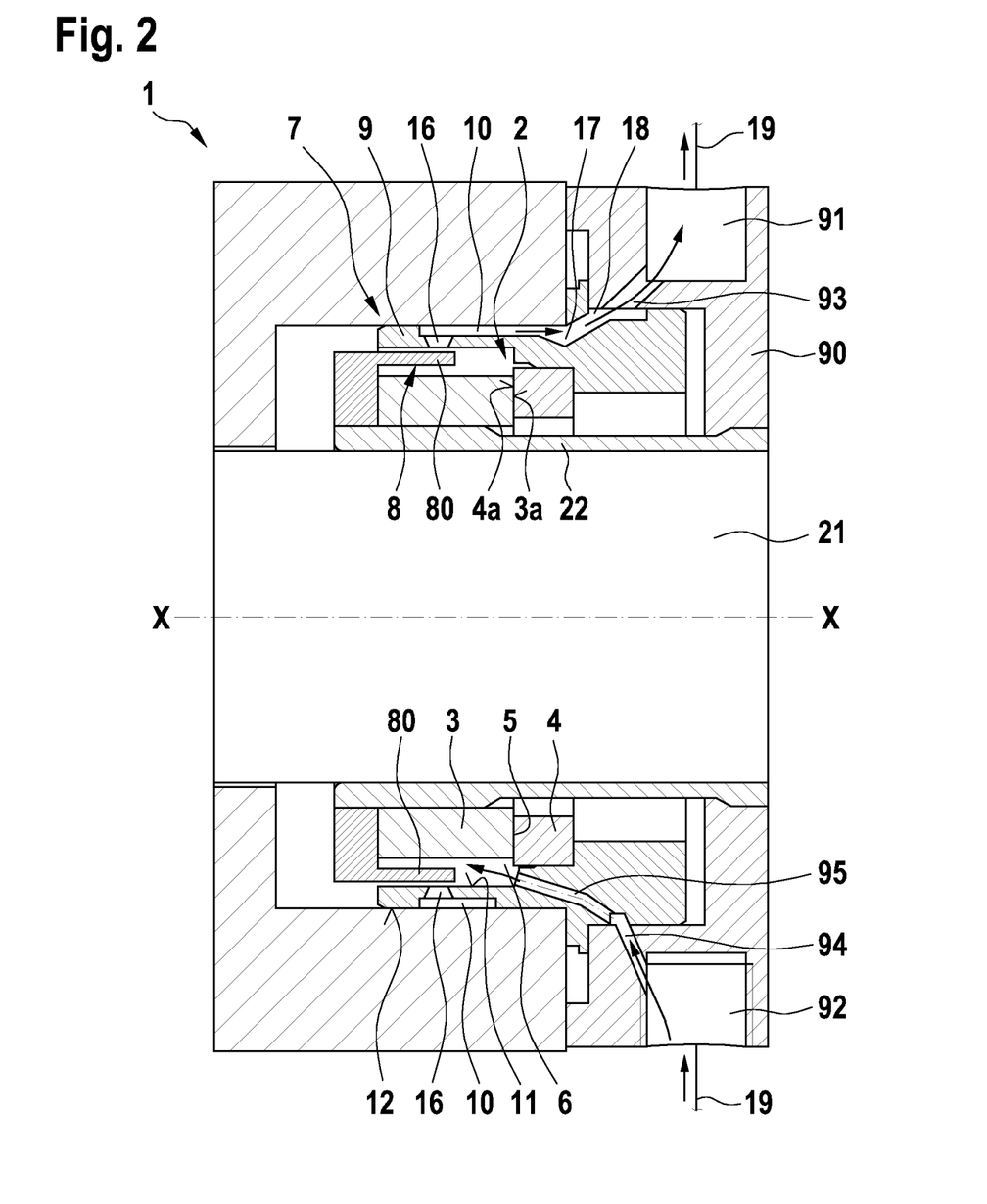
FIG. 2 is a schematic sectional view of the mechanical seal arrangement of FIG. 1.

The mechanical seal arrangement 1 may be seen in detail in FIG. 2. Herein, the mechanical seal arrangement 1 comprises a mechanical seal 2 and a recirculation conveyor 7.

The mechanical seal 2 comprises a rotating slide ring 3 and a stationary slide ring 4, which define a sealing gap 5 between the sealing surfaces $3a$, $4a$ thereof. The rotating slide ring 3 is fixed on a sleeve 22 which is pressed onto the drive shaft 21, for example using an interference fit.

The recirculation conveyor 7 comprises a recirculation rotor 8, which is fixed to the sleeve 22, and a hollow cylindrical housing 9, the recirculation rotor 8 being arranged inside the hollow cylindrical housing 9. The recirculation conveyor 7 further comprises a recirculation line 19 in which a cooling device 20 is arranged for cooling the recirculated fluid (cf. FIG. 1).

Figure 4:
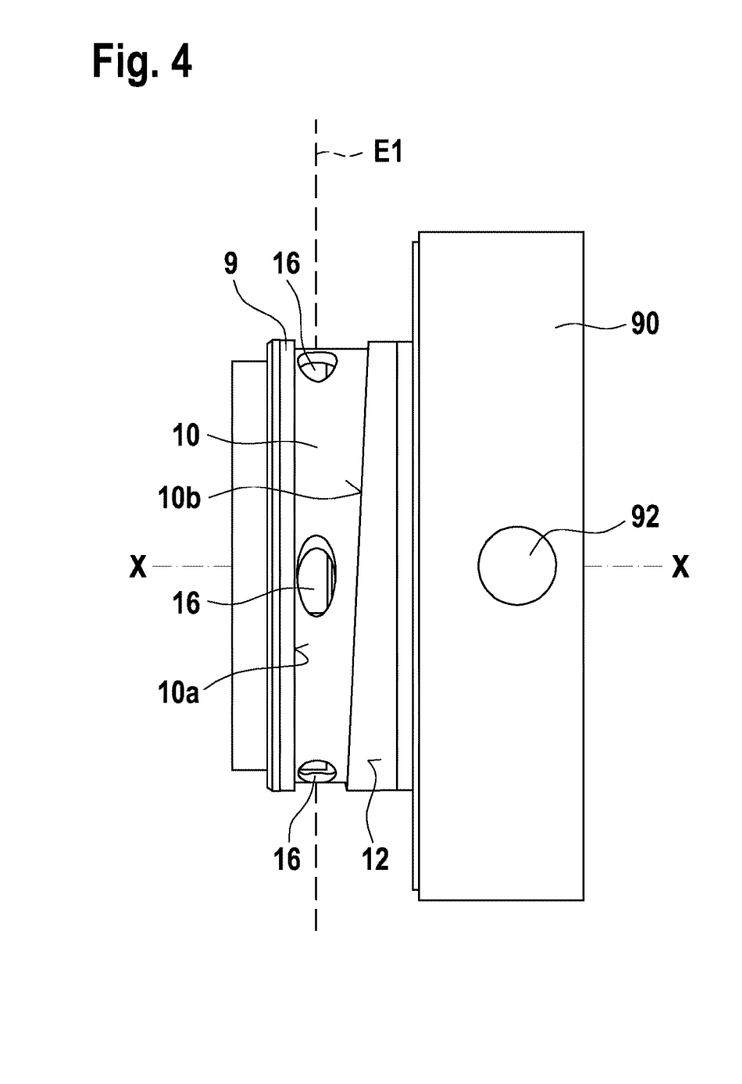
Figure 5:
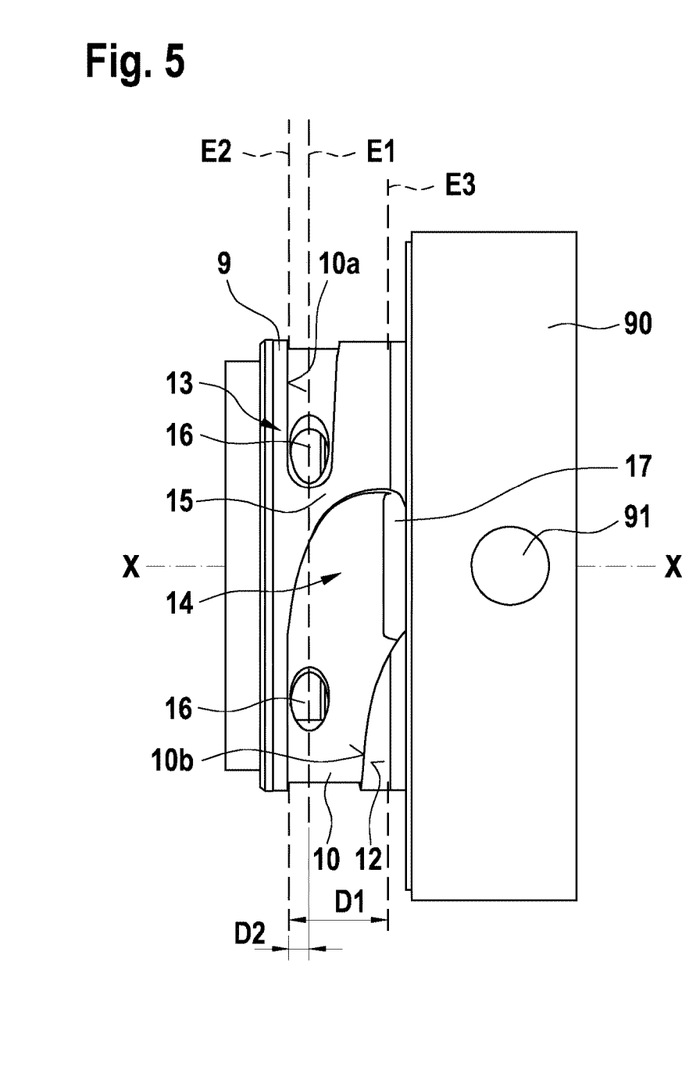
Figure 6:
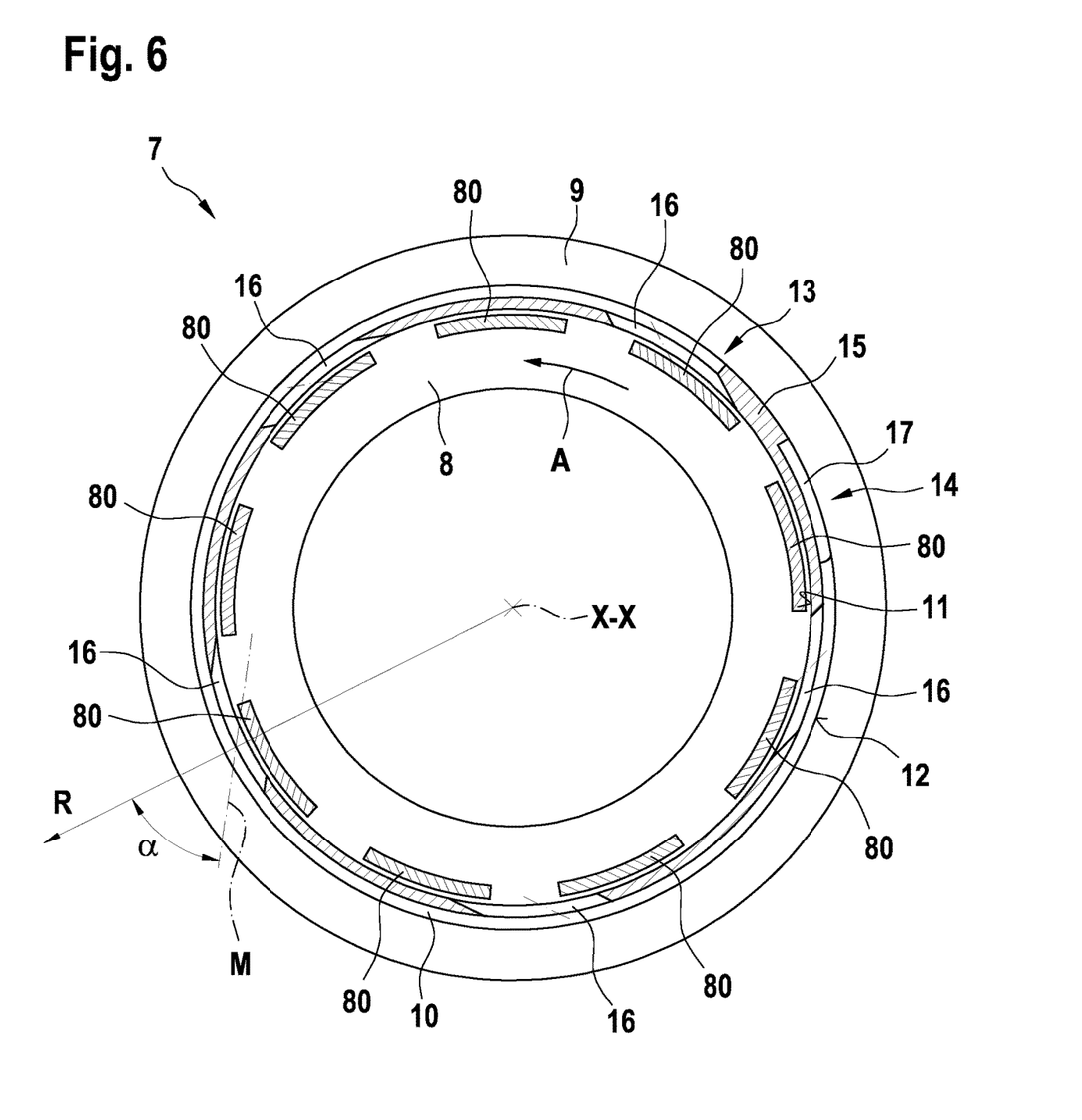
FIG. 6 is a schematic sectional view of the recirculation conveyor of FIG. 2.

The recirculation rotor 8 and the hollow cylindrical housing 9 of the recirculation conveyor 7 are shown in detail in FIGS. 3 to 6. The circulation rotor 8 is arranged within the housing 9 and comprises a plurality of blades 80. In this embodiment the circulation rotor 8 comprises exactly nine blades, as shown in FIG. 6.

The hollow cylindrical housing 9 has an inner shell surface 11 and an outer shell surface 12. As may be seen from FIG. 2, the circulation rotor 8 is arranged at a small distance from the inner shell surface 11. A conveyor channel 10 is formed in the outer shell surface 12. The conveyor channel 10 has a depth of only a few millimeters.

Figure 3:
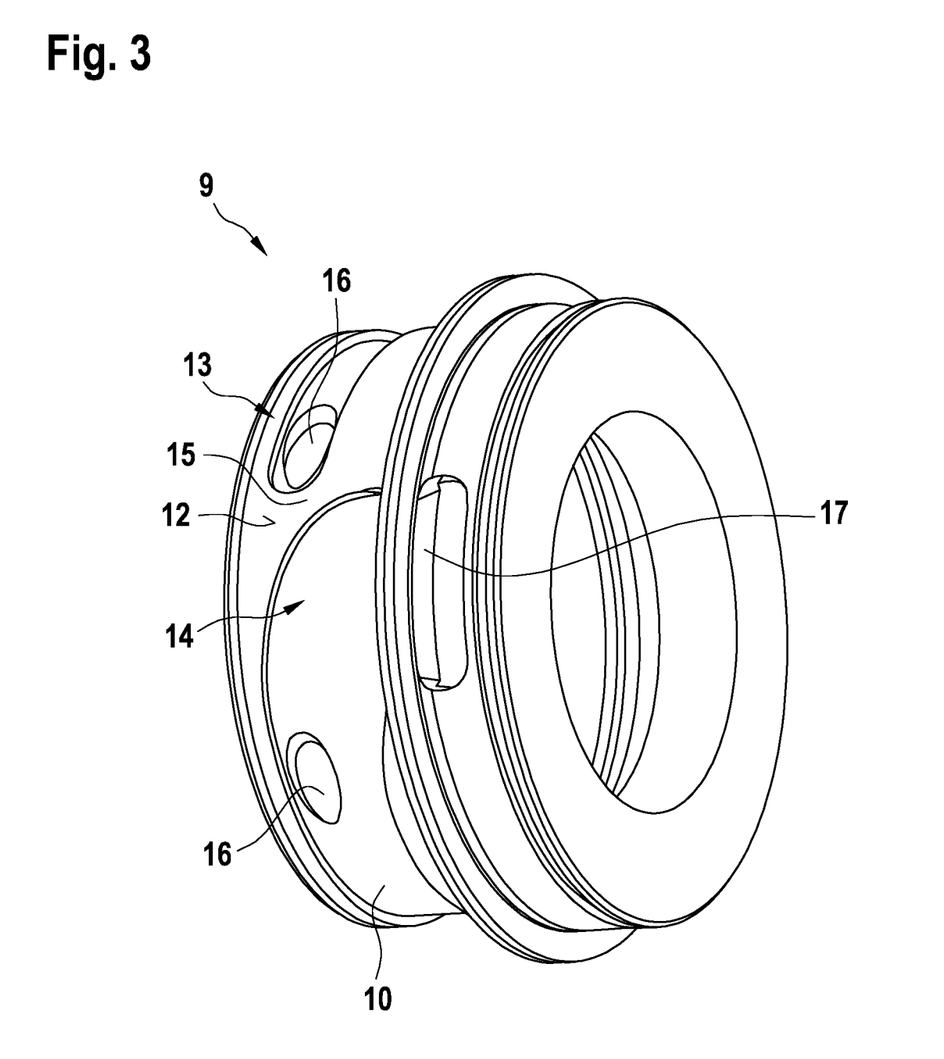
FIG. 3 is a schematic perspective view of a housing of a recirculation conveyor of FIG. 2, FIGS. 4 and 5 are schematic side views of the housing of FIG. 3.

As may be seen from FIGS. 3 to 5, the conveyor channel 10 is comprised of a start portion 13 and an end portion 14. Herein, the start portion 13 and the end portion 14 are separated from each other by a separating web 15. As a result, the conveyor channel 10 is not located entirely circumferentially on the outer circumference of the housing 9, but connects the start portion 13 with the end portion 14 only in one circumferential direction. In this way, conveying losses can be avoided, which would occur if a fully circumferential channel were provided.

In order to ever be able to convey fluid from the circulation rotor 8 into the conveyor channel 10, a plurality of feed openings 16 are provided in the hollow cylindrical housing 9. In this example embodiment, exactly five feed openings 16 are provided. The feed openings 16 are through openings which connect the inner shell surface 11 of the housing 9 to the conveyor channel 10. Thus, fluid is conveyed from a radially inner side of the housing 9 into the conveyor channel 10 at the radially outer side of the housing.

As may especially be seen from FIGS. 2 and 3, a single outlet opening 17 is provided at the end portion 14 of the conveyor channel 10. The outlet opening 17 is directed in the axial direction (cf. FIG. 6). An outlet channel 18 is connected to the outlet opening 17, which leads to a first port 91, where the recirculation line 19 starts. The first port 91 is connected to the outlet channel 18 via a first connection port 93. The first port 91 is arranged in a second housing part 90.

The recirculation line 19 then leads the fluid to the cooling device 20 and therefrom, the fluid reaches a second port 92, which is also provided in the second housing part 90. As may be seen from FIG. 2, the first port 91 and the second port 92 can be opposite each other by 180°.

From the second port 92, fluid is directed into a cavity 6 on the mechanical seal via a second connecting port 94 and another connecting channel 95. This allows cool fluid to be supplied to the regions of the sealing gap 5 and the two slide rings 3, 4, so that the temperature at the mechanical seal 2 cannot become too high.

Thus, according to the invention, fluid which is conveyed by the pump 31 is also used for cooling the mechanical seal 2. In this case, the fluid is fed via the gap 35 to the recirculation conveyor 7 and from there is guided via the feed openings 16 and the conveyor channel 10 to the single outlet opening 17. From there, the fluid is led via the recirculation line 19 to the cooling device 20, where it is cooled and then led back into the cavity 6 at the mechanical seal 2 via the second port 92 and the second connection port 94 and the further connection channel 95. This makes it possible for a temperature at the mechanical seal 2 and its components to be kept relatively low.

As may be seen especially from FIGS. 4 and 5, the feed openings 16 are provided such that the centers of all feed openings 16 are arranged in a first plane E1, which is perpendicular to an axial direction X-X of the mechanical seal. The feed openings 16 are positioned directly adjacent to a first wall 10a of the conveyor channel 10.

As may be seen from FIG. 5, the first wall 10a is provided such that the first wall 10a is provided in a second plane E2, which is also perpendicular to an axial direction X-X. A second wall 10b of the conveyor channel 10 is then arranged such that the conveyor channel 10 continuously increases in size starting from the start portion 13 to the end portion 14. Furthermore, a start of the exit opening 17 is located in a third plane E3, which is perpendicular to the axial direction X-X. Herein, a first distance D1 between the second plane E2 and the third plane E3 is at least twice as large as a second distance D2 between the second plane E2 and the first plane E1. Thus, it can be ensured that there is a distance sufficiently large between the feed openings 16 and the outlet opening 17, which further improves the performance of the recirculation conveyor 7.

As may further be seen from FIG. 6, the feed openings 16 are further provided such that a center line M of each feed opening 16 is arranged at an acute angle α to a radial line R, starting from a center axis of the mechanical seal 2. Thus, the feed openings 16 are inclined in the direction of rotation (conveying direction), which is indicated by the arrow A in FIG. 6, further increasing the conveying capacity into the conveyor channel 10. Herein, the angle a is the same for all feed openings 16.

The number of feed openings 16 and the number of blades 80 of the recirculation rotor 8 are selected such that the number of blades is not an even multiple of the feed openings 16. This allows any vibrations that may occur during operation to be suppressed.

Further preferably, a sum of all cross sections of the feed openings is equal to a cross section of the outlet opening 17.

By providing the recirculation conveyor 7, it is furthermore possible to dispense with a separate barrier fluid system with an additional fluid and still achieve cooling of the mechanical seal 2. Hereby, on the one hand, investment costs for the system can be reduced and, on the other hand, operating costs are also significantly reduced, since no additional separate circulation pump is required to be operated in the circulation circuit. The recirculation of the fluid for cooling is carried out exclusively by means of the recirculation conveyor 7 of the invention.

As may be seen from FIG. 1, the recirculation conveyor 7 is arranged in the axial direction X-X between the pump 31 and the mechanical seal 2. In this case, the mechanical seal arrangement 1 and especially the recirculation conveyor 7 are arranged inside the pump housing 33. The design of the recirculation conveyor 7 according to the invention allows to be designed extremely flat such that, for example, upgrading already existing pumps using a mechanical seal arrangement 1 according to the invention is also possible without the need of any adjustments to the pump. Another advantage of the invention resides that an overall length in the axial direction X-X of the mechanical seal arrangement 1 can be kept relatively short, since the part of the recirculation conveyor 7 and part of the mechanical seal 2 can be arranged within the pump housing 33. Thus, the mechanical seal arrangement 1 also meets the requirements necessary for the radial installation space, which is desired to be kept maximally small by the pump suppliers.

Furthermore, a pump manufacturer does not have to modify a pump housing 31 for cooling according to the invention, as an inlet and an outlet are integrated in the mechanical seal arrangement 1 according to the invention.

In the following, a mechanical seal arrangement 1 according to a second preferred embodiment example of the invention is described in detail while making reference to FIG. 7. The second embodiment example is substantially the same as the first embodiment example, with technically equal components being designated by the same reference signs.

Figure 7:
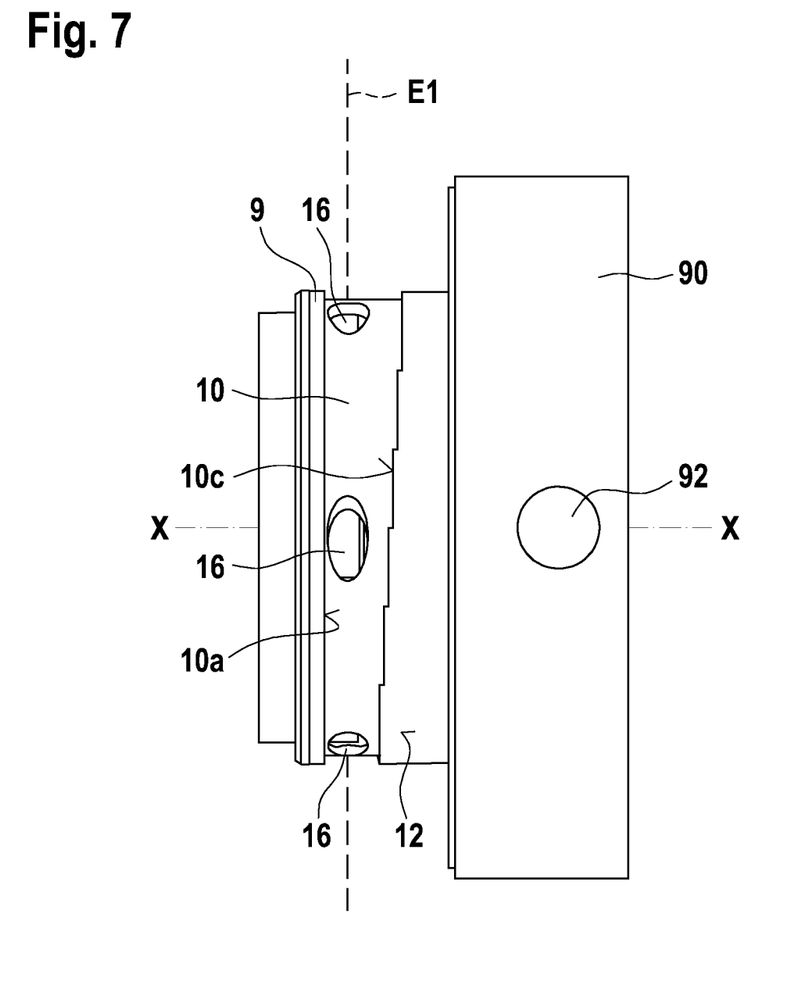
FIG. 7 is a schematic view of a housing of a pump arrangement having a mechanical seal arrangement according to a second preferred embodiment of the invention.

As may be seen from FIG. 7, the geometric shape of the conveyor channel 10 in the second embodiment example is configured differently from the first embodiment example. Instead of continuously widening the conveyor channel, widening the conveyor channel 10 will be performed in steps starting from the start portion 13 to the end portion 14. In this case, a second wall 10c which expands in steps is provided. In each case, the length of the steps in the circumferential direction is the same. Due to the step-shaped second wall 10c, any pressure increase in the channel 10 can thus be defined very precisely during operation.

In other respects, the second embodiment example corresponds to the first embodiment example, so that reference can be made to the description given therein.

LIST OF REFERENCE NUMBERS

1 Mechanical seal arrangement
2 Mechanical seal
3 Rotating slide ring
3a Sealing surface of rotating slide ring
4 Stationary slide ring
4a Sealing surface of stationary slide ring
5 Sealing gap
6 Cavity at the mechanical seal
7 Recirculation conveyor
8 Recirculation rotor
9 Hollow cylindrical housing
10 Conveyor channel
10a First wall
10b Second wall
10c Second wall, widening in steps
11 Inner shell surface
12 Outer shell surface
13 Start portion
14 End portion
15 separating web
16 Feed openings 17 Outlet opening
18 Outlet channel
19 Recirculation line
20 Cooling device
21 Drive shaft
22 Sleeve
30 Pump arrangement
31 Pump
32 Pump rotor
33 Pump housing
34 Fluid chamber
35 Gap
36 Atmosphere
37 Receiving chamber
80 Blades
90 Second housing part
91 First connection
92 Second connection
93 First connecting port
94 Second connecting port
95 Additional connecting port
A Direction of rotation
D1 First distance
D2 Second distance
E1 First plane
E2 Second plane
E3 Third plane
M Center axis of feed opening
R Radial line
X-X Axial direction
α Acute angle

The invention claimed is:

1. A mechanical seal arrangement for sealing on a rotating component, comprising:
   a mechanical seal having a rotating slide ring and a stationary slide ring, which define a sealing gap between the sliding surfaces thereof
   a recirculation conveyor arranged adjacent to the rotating slide ring,
   wherein the recirculation conveyor includes a recirculation line in which a cooling device (20) for cooling the recirculated fluid is arranged, a recirculation rotor and a hollow cylindrical housing,
   wherein the recirculation line leads to a cavity in the region of the sealing gap of the mechanical seal,
   wherein the hollow cylindrical housing includes an inner shell surface and an outer shell surface, and
   wherein a conveyor channel is provided on the outer shell surface, which conveyor channel is formed along the outer shell surface from a start portion to an end portion,
   wherein the start portion of the conveyor channel is separated from the end portion by a separating web,
   wherein a plurality of feed openings are provided in the hollow cylindrical housing, which open from the inner shell surface into the conveyor channel, and
   wherein a single outlet opening is provided at the end portion.

2. The mechanical seal arrangement according to claim 1, wherein the outlet opening is directed in an axial direction of the mechanical seal arrangement.

3. The mechanical seal arrangement according to claim 1, wherein a width of the conveyor channel is widened from the start portion to the end portion.

4. The mechanical seal arrangement according to claim 3, wherein the conveyor channel widens continuously or widens stepwise starting from the start portion to the end portion.

5. The mechanical seal arrangement according to claim 1, wherein center axes of the feed openings are inclined towards radial lines at an angle α.

6. The mechanical seal arrangement according to claim 1, wherein the recirculation rotor comprises a plurality of blades.

7. The mechanical seal arrangement according to claim 6, wherein the number of blades is not an even multiple of the number of feed openings.

8. The mechanical seal arrangement according to claim 1, wherein all centers of the feed openings are located in a first plane which is perpendicular to the axial direction.

9. The mechanical seal arrangement according to claim 1, wherein the conveyor channel comprises a first wall located in a second plane which is perpendicular to the axial direction.

10. The mechanical seal arrangement according to claim 9, wherein a start of outlet opening is located in a third plane which is perpendicular to the axial direction, and wherein a first distance between the second and third planes is at least twice as large as a second distance between the second and first planes.

11. A pump arrangement comprising a pump having a pump rotor and a mechanical seal arrangement according to claim 1.

12. The pump arrangement according to claim 11, wherein the mechanical seal arrangement is arranged radially inside a pump housing.

* * * * *